United States Patent

Bugnone

[11] 4,248,117
[45] Feb. 3, 1981

[54] DIE STAMPING AND SCORING DEVICE, AND PROCESS FOR THE MANUFACTURE THEREOF

[76] Inventor: Aldo Bugnone, Via Bellini 2, Turin, Italy

[21] Appl. No.: 922,138

[22] Filed: Jul. 5, 1978

[30] Foreign Application Priority Data

Jul. 13, 1977 [IT] Italy .............. 68634 A/77

[51] Int. Cl.³ .................. B26D 3/08; B26F 1/20
[52] U.S. Cl. .................. 83/863; 83/346; 83/347; 83/665; 83/887; 76/107 C
[58] Field of Search ........... 83/346, 347, 663, 669, 83/670, 673, 674, 675, 863, 864, 886, 887; 76/107 C; 93/58.1, 58.2 R

[56] References Cited

U.S. PATENT DOCUMENTS

| 2,735,488 | 2/1956 | Anderson et al. ............. 83/665 |
| 3,142,233 | 7/1964 | Downie ............. 76/107 C X |
| 3,257,885 | 6/1966 | Hornung ............. 83/669 X |
| 3,280,682 | 10/1966 | Saver ............. 76/107 C X |
| 3,322,004 | 5/1967 | Wolfe ............. 76/107 C |
| 3,503,293 | 3/1970 | Sander ............. 83/481 |
| 3,645,155 | 2/1972 | Robinson ............. 76/107 C |
| 3,744,384 | 7/1973 | Jarritt ............. 76/107 C X |
| 3,805,657 | 4/1974 | Simpson ............. 76/107 C X |
| 3,941,038 | 3/1976 | Bishop ............. 76/107 C X |

FOREIGN PATENT DOCUMENTS 283098   4/1971   U.S.S.R. ............. 83/665

Primary Examiner—J. M. Meister
Attorney, Agent, or Firm—Sughrue, Rothwell, Mion, Zinn & Macpeak

[57] ABSTRACT

A die stamping device for cutting, scoring or creasing a pattern of shapes onto laminar material, comprises a die cylinder having a solid cylindrical core with a coating of setting material such as plastics in which are fitted cutting or scoring blades the radially outer surfaces of which define the pattern to be cut or creased onto laminar material passed in sheet or web form between the die cylinder and a smooth pressure cylinder, which may be provided with cooperating elements, such as resilient blocks or engraved recesses to cooperate with the scoring or creasing blades; the die cylinder is made by a process involving forming a pattern on the outer surface of the coating by photographic techniques, and then removing the coating from the solid cylindrical core to facilitate cutting out the openings to receive the blades.

1 Claim, 4 Drawing Figures

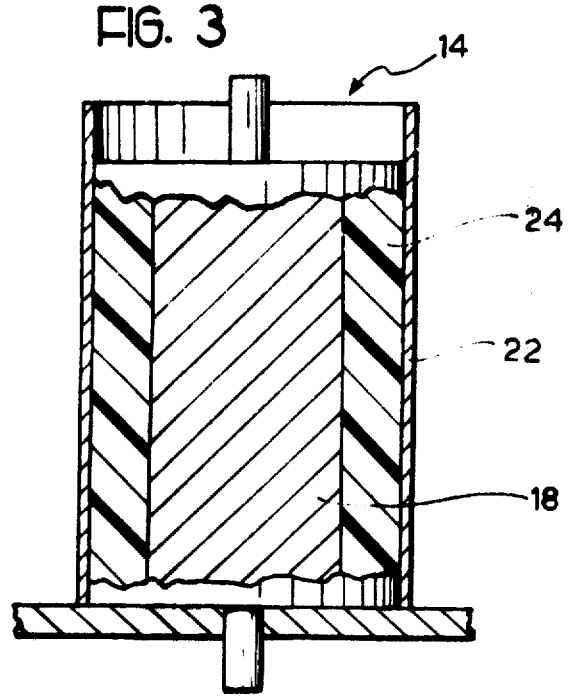
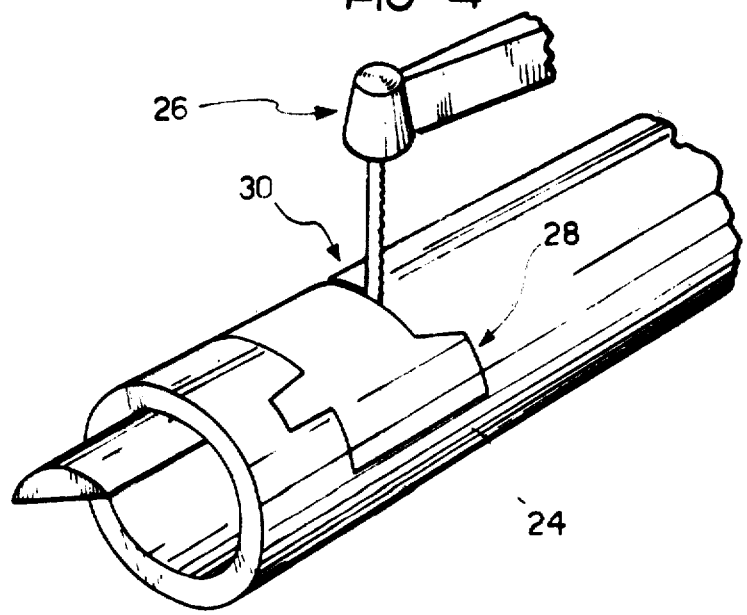

DIE STAMPING AND SCORING DEVICE, AND PROCESS FOR THE MANUFACTURE THEREOF

The present invention relates in general to die cutting or stamping apparatus, and to a process for the manufacture of a novel form of die or punch for effecting die stamping. When used in this specification the expression "die stamping" will be understood to refer to a process for cutting shapes out of flat sheet material such as paper, plastics or leather either to remove the cut-out portions altogether or alternatively to cut out the major part of a shape, leaving small bridges between the cut out portion and the remainder of the sheet. In addition, die stamping can be used for creasing or scoring a sheet of material either instead of cutting out a portion or as well as cutting out a portion so that the cut portion and/or the remainder of the sheet can be folded more readily along predetermined fold lines defined by the creasing or scoring.

The die stamping of leather, plastics material, cardboard and the like is generally effected by means of the use of flat die stamps or punches which may be made from solid steel or from a strip of plywood, which have openings cut into them in dependence on the shape to be cut out or scored by the punch, these openings carrying steel elements to serve as cutting knives or as blunter scorers or creasers; such elements will be referred to hereinafter as blades, which may be either cutting blades or scoring blades. Known flat plywood hollow dies or punches are usually known as "American dies", and are of relatively low cost; moreover they can be made easily and the blade may be easily replaced when worn.

However, in a case where there is to be effected die stamping with a large number of scored and cut lines in one stroke, the area of contact of the blades with the workpiece is fairly high and a very considerable pressure is required in order to effect the required cutting and scoring in one stroke. Moreover, with the conventional flat system the cardboard, or other type of material being worked, is inserted between two plattens, one of them carrying the die, which plattens open and close alternately thereby severely limiting the speed of production.

Attempts have been made to carry out die stamping by means of a rotary system, either by cutting the die from a solid steel cylinder, or by mounting the blades by various mechanical systems to the body of a steel cylinder, or by means of a plurality of perforated wooden sectors carrying steel blades, which are fixed as a cover over a core constituted by a steel roller. This last construction, which resembles the flat American die is, however, very difficult to manufacture, especially in regard to the determination of the perforation angles, in that the surface of the wood sectors on which the blades are mounted is spaced from that of the workpiece into which the cutting or scoring ends of the blades project in use of the tool, and even a very small displacement may cause unacceptable variations in the shape and/or position of the cut or score line made by the blade.

The present invention seeks to eliminate such disadvantages by providing a device which can be constructed easily, with very considerable precision, and at relatively low cost.

According to the present invention, there is provided a die stamping device for cutting and/or scoring, in which cutting and/or scoring blades are carried on a cylinder and cooperate with a pressure cylinder driven to rotate in the opposite direction from the die stamp cylinder, strip or sheet material to be cut and/or scored passing between the two cylinders in use of the device.

One embodiment of the invention will now be more particularly described, by way of example, with reference to the accompanying drawings, in which:

FIG. 3 is an axial section illustrating one of the steps in a manufacturing process for producing the die stamping cylinder; and FIG. 4 illustrates another step in the production of the cylinder.

Figure 1:
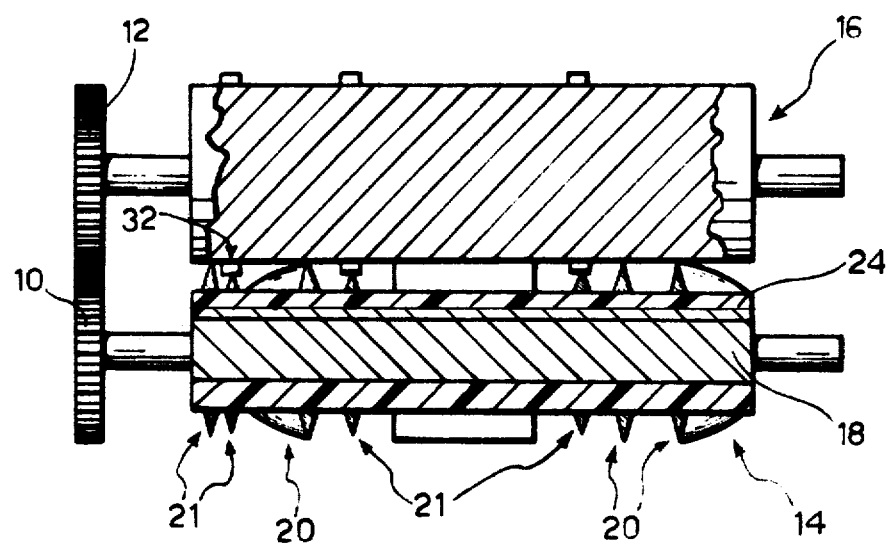
FIG. 1 is a partially sectioned side view of a part of a die stamping and scoring or creasing machine.
Figure 2:
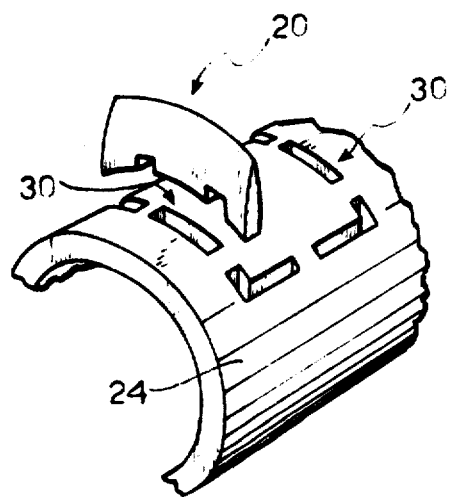
FIG. 2 is a detail, on an enlarged scale, of a part of the machine of FIG. 1.

Referring now to the drawings, there is shown, in FIG. 1, a rotary die stamping machine comprising a cylindrical punch or die 14 and a pressure cylinder 16 between which pass sheets of cardboard or other material to be incised and creased or scored in a pattern determined by the cutting and scoring blades of the cylindrical die 14 as will be described in greater detail below. The overall area of the pattern to be cut out and the positions of the cut and scored lines determines the area of the surface in which the tips of the blades lie, and therefore the diameter of the cylindrical die 14 and the pressure cylinder 16. This diameter, determined as that which will produce, in development, the required area, will be referred to hereinafter as the development diameter. The two cylinders 14, 16 are drivingly connected by a pair of toothed wheels 10, 12 having a pitch diameter equal to the diameter of the pressure cylinder, which as mentioned above is equal in diameter to the cylindrical surface in which lie the tips of the cutting blades 20 of the cylindrical die 14. Certain of the blades 21 are shorter than the others; these are the scoring blades which do not cut right through the material as it passes between the cylinders, but merely crease or score lines in this material.

The cylindrical die 14 has a steel core 18 the diameter of which is equal to the development diameter reduced by twice the height of the blades 20.

Starting with the cylinder core 18 in a vertical position, and enclosed within a sheet steel (or other material) jacket 22, located coaxially with respect to the cylinder 18 and having an internal diameter slightly in excess of the development diameter, plastics material 24 (or other setting material) is cast into the airspace thus formed. Once the cast material has hardened, the outer jacket 22 is removed and the cylinder, thus coated with a plastics sleeve, is mounted on a lathe on which the external diameter of the sleeve is turned down exactly to the value of the development diameter.

With the coated cylinder still on the lathe, a film of photosensitive substance is sprayed onto the sleeve 24, and then an opaque film having transparent regions representing the pattern to be reproduced is laid against it and the photosensitive film is exposed to light and then developed, thereby causing the pattern 28 to be die stamped to be transferred with very high precision onto the sleeve 24 which covers the steel core cylinder 18.

The sleeve 24 thus printed is then removed from the steel core 18 and, by means of a jig saw or other piercing machine 26, is pierced with radial openings 30 following the outline 28 of the pattern to be die stamped. This done, the sleeve 24 is reassembled onto the steel core 18, which is fitted with a radial tooth (not illustrated) to engage in a notch in the sleeve 24 to position this always in the same position with respect to the core and to avoid slipping between the core 18 and the sleeve 24 when the die stamping cylinder is in use. The sleeve 24, now perforated, is again turned down, this time to a diameter which is substantially less than the development diameter, to enable the blades 20, 21 to project therefrom and thus be exposed to cut.

Instead of extracting the sleeve from the core in one piece, it would be possible to operate as follows: once the printing of the required pattern has been effected on the sleeve this, and the core 18, are pierced with radial holes at suitable points, these holes being screw threaded, then the sleeve 24 is cut into two or more shells, each of which includes a complete figure to be cut and not a cut piece, and the threaded holes necessary for subsequent refixing of the shell to the core 18. The printed patterns are then cut out and the shells reassembled by means of screws appropriately inserted into the previously formed threaded holes, and recessed to permit subsequent turning.

Into the openings 30 which have been pierced in the sleeve 24 there are first fixed the scoring or 'creasing' blades 21 which are to be shorter than the cutting blades 20: after having been secured in the openings, for example by means of adhesive, they are all ground down to the same diameter, which is less, as has been said, than the development diameter, so that they may only score and not cut. After the grinding operation all the working ends of the scoring blades lie on the same cylindrical surface.

Following the same process the cutting blades 20 are first assembled and then ground exactly to the development diameter.

The die stamping cylinder 14, and the pressure cylinder 16 may now be assembled onto the machine, each having a working diameter equal to the development diameter, that is the diameter corresponding to the development of the area to be die stamped; the cutting blades 20 must meet with great precision the surface of the pressure cylinder 16, in order to be capable of cutting right through the strip or sheet of card or other material which passes between the two cylinders 14 and 16, without the contact pressure being so great as to blunt the blades.

In positions corresponding to those of the scoring blades 21, the pressure cylinder 16 is provided with small blocks 32 of treated cardboard or similar yielding material, to ensure that in fact the strip or sheet of material passing between the cylinders is only scored and not cut, (that is, not completely cut through its thickness) by the scoring blades 21, as intended.

It is then an easy and quick matter to replace the cutting blades 20 or the scoring blades 21 when they become worn. Moreover, in the case of die stamping a different pattern but with the same area, it is, as described above, sufficient to construct only a second sleeve of plastics material, using the same steel core 18 and the same pressure cylinder 16, thus obtaining a very great saving in time and money; of course the position of the treated carboard blocks 32 on the pressure cylinder 16 would also have to be changed to correspond to the new position of the scoring blades 21.

It is also possible, in the case of heavy and repetitive production, to provide the pressure cylinder with milled recesses in correspondence with the scoring blades 21, after having transferred the positions of these by contact between the die stamping cylinder and the pressure cylinder, using, for example a coloured substance (engineer's blue) designed for the purpose. In this case the scoring blades will have the same radial height as the cutting blades or will even be slightly longer in the case of an incomplete cut.

In the case where a cutting or scoring blade proves to be too low in relation to the others, its position may be changed as follows:

(1) first check whether the grinding operation has been correctly carried out;

(2) remove the defective blade and apply a metal coating to the base of this by chemical or electrolytic means, or by fixing mechanically (or by adhesive) to a thickness sufficient to rectify the deficiency.

(3) replacing the defective blade entirely.

Of course, it will be appreciated that during the operation of grinding the blades down to the required diameter the cutting shape is changed, but the exact cutting angle may be restored by means of a shaped grinding wheel and support which may be directly mounted onto the grinding machine.

The process thus described is of very low costs in comparison with the known process of grinding blades from a solid cylinder, or that of employing inserts of wood, steel or other material on sectors which surround the steel cylinder core. The cost of the process of the present invention is, in fact, very near to that of the manufacture of an American flat die stamp, and with a precision that is equal to or greater than previously obtained, but with the advantage in use of allowing higher working speeds insofar as working is continuous and not alternating. Moreover the cylindrical die stamp is very durable and promises to have a long life because the pressure cylinder and the blades come into contact smoothly from point to point as the cylinders effectively roll over one another, whereas in previous flat die stamps pressure is applied with a sharp jerk or shock between the two plates.

I claim:

1. A die stamping device comprising a die stamp cylinder, a pressure cylinder positioned to cooperate with said die stamp cylinder and means for driving said die stamp cylinder and said pressure cylinder to rotate in opposite directions from one another, whereby laminar material to be die stamped can be passed between said two cylinders, said die stamp cylinder including a metal core, a removable tubular unitary plastic sleeve surrounding said core, means defining a plurality of openings in said sleeve, blade means secured in said openings and means detachably securing said sleeve to said core for rotation therewith whereby said sleeve is interchangeable on the same core for other sleeves having differently positioned openings for different blades; said blade means include cutting blades having a predetermined external diameter and scoring blades having a diameter less than the diameter of the said cutting blades and further comprising blocks of yielding material on the surface of said pressure cylinder in opposition to said scoring blades.

* * * * *